US008359584B2

(12) United States Patent
Rao et al.

(10) Patent No.: US 8,359,584 B2
(45) Date of Patent: Jan. 22, 2013

(54) DEBUGGING FROM A CALL GRAPH

(75) Inventors: Abhijit Rao, Seattle, WA (US); Steven J. Steiner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 12/641,629

(22) Filed: Dec. 18, 2009

(65) Prior Publication Data

US 2011/0154300 A1 Jun. 23, 2011

(51) Int. Cl.
G06F 9/44 (2006.01)
G06F 9/45 (2006.01)

(52) U.S. Cl. ........ 717/133; 717/128; 717/144; 717/157; 717/158

(58) Field of Classification Search .................. None
See application file for complete search history.

(56) References Cited

U.S. PATENT DOCUMENTS

| | | | |
|---|---|---|---|
| 5,737,516 A | 4/1998 | Circello et al. | |
| 5,740,443 A * | 4/1998 | Carini | 717/133 |
| 5,870,606 A | 2/1999 | Lindsey | |
| 6,094,729 A | 7/2000 | Mann | |
| 6,161,200 A | 12/2000 | Rees et al. | |
| 6,202,199 B1* | 3/2001 | Wygodny et al. | 717/128 |
| 6,226,789 B1* | 5/2001 | Tye et al. | 717/158 |
| 6,282,701 B1* | 8/2001 | Wygodny et al. | 717/128 |
| 6,665,866 B1* | 12/2003 | Kwiatkowski et al. | 717/144 |
| 6,934,935 B1* | 8/2005 | Bennett et al. | 717/158 |
| 7,058,928 B2* | 6/2006 | Wygodny et al. | 717/128 |
| 7,165,190 B1 | 1/2007 | Srivastava et al. | |
| 7,200,588 B1 | 4/2007 | Srivastava et al. | |
| 7,367,024 B2* | 4/2008 | Barua et al. | 717/157 |
| 7,380,239 B1 | 5/2008 | Srivastava et al. | |
| 7,526,758 B2* | 4/2009 | Hasse et al. | 717/133 |
| 8,141,064 B2* | 3/2012 | Chipman | 717/157 |
| 8,181,167 B2* | 5/2012 | Zhao | 717/144 |
| 2003/0061600 A1* | 3/2003 | Bates et al. | 717/133 |
| 2004/0003385 A1* | 1/2004 | Kushlis | 717/158 |
| 2006/0218543 A1* | 9/2006 | Boger | 717/157 |

(Continued)

OTHER PUBLICATIONS

Dorian C. Arnold et al., Stack Trace Analysis for Large Scale Debugging, IEEE 2007, [Retrieved on Jun. 25, 2012]. Retrieved from the internet: <URL: http://ieeexplore.ieee.org/stamp/stamp.jsp?tp=&arnumber=4227982> 10 Pages (1-10).*

(Continued)

*Primary Examiner* — Don Wong
*Assistant Examiner* — Anibal Rivera
(74) *Attorney, Agent, or Firm* — Gary Mager

(57) ABSTRACT

A system and method for debugging a computer program by using a call graph. A call graph that represents trace events during execution of a debuggee program may be used as input to a system that enables a user to debug the debuggee program. Mechanisms facilitate conditionally forming clusters of event nodes, a cluster indicative of multiple event nodes corresponding to an execution of a source language statement. During a debugging session, in response to a command to perform a step operation, the nodes of a cluster are processed together so that a step corresponds to multiple events if the multiple events correspond to a single source language statement. A mechanism for inspecting variables is provided. Variable values may be selectively propagated and provided based on the call graph and a static control flow analysis of the debuggee program.

20 Claims, 11 Drawing Sheets

U.S. PATENT DOCUMENTS

| | | | | |
|---|---|---|---|---|
| 2008/0163176 | A1* | 7/2008 | Krauss | 717/128 |
| 2008/0256521 | A1* | 10/2008 | O'Brien et al. | 717/133 |
| 2008/0313602 | A1 | 12/2008 | Tillmann et al. | |
| 2009/0019428 | A1 | 1/2009 | Li et al. | |
| 2009/0271769 | A1* | 10/2009 | Krauss | 717/133 |
| 2010/0083240 | A1* | 4/2010 | Siman | 717/144 |

OTHER PUBLICATIONS

Dean F. Jerding et al., Visualizing Interactions in Program Executions, ACM 0-89791-914-9, 1997, [Retrieved on Jun. 25, 2012]. Retrieved from the internet: <URL: http://dl.acm.org/citation.cfm?id=253356> 11 Pages (360-370).*

Thomas Ball et al., Optimally Profiling and Tracing Programs, ACM 0164-0925/94/0700-1319, 1994, [Retrieved on Jun. 25, 2012]. Retrieved from the internet: <URL: http://dl.acm.org/citation.cfm?id=183527> 42 Pages (1319-1360).*

"RTA-TRACE", Retrieved at<<http://www.etas.com/en/products/982.php>>, Oct. 15, 2009, p. 1.

"DevTracer—The Trace Monitor for Software Developers and Testers", Retrieved at <<http://www.devtracer.com/>>, Oct. 15, 2009, p. 2.

Dutta, et al. "Debugging Software/Firmware Using Trace Function Re-Usable Components ", Retrieved at<<http://www.embedded.com/design/opensource/217701152>>, Jun. 1, 2009, p. 3.

"Intel Trace Analyzer and Collector 7.2 Update 1", Retrieved at <<http://software.intel.com/sites/products/collateral/hpc/cluster/itac_brief.pdf>>, Retrieved Date: Oct. 15, 2009, pp. 3.

* cited by examiner

DEBUGGING FROM A CALL GRAPH

BACKGROUND

One technique for analyzing or debugging a program employs a call graph that indicates function calls made during an execution of a computer program. A call graph may include temporal information, indicating a sequence of function calls. One way of generating a call graph is to insert instructions within the user program, the execution of the instructions causing certain events to occur. During execution of the computer program, these events may be written to a log file. After execution of the computer program, an analysis program may examine the log file and generate a call graph, based on the sequence of events. This technique is referred to as a call trace, and the events are referred to as call trace events. A developer may use the call graph generated by a call trace to analyze the computer program in order to find problems, such as bugs or inefficiencies.

Another debugging technique involves taking a snapshot of the program's call stack. During execution of the program, a developer may break execution of the program at a desired point, and examine the contents of the call stack. The call stack indicates a sequence of frames. The frames correspond to functions that are currently active, with the top frame of the stack indicating the current function, the next frame down indicating a parent function, and so forth. Some debugging systems may periodically take snapshots of the call stack and write them to a log file, for a later analysis by a developer. This technique is referred to as a sample trace. Sample traces provide accurate information, though it may be incomplete due to the fact that they are simply snapshots of an executing program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to facilitate debugging a debuggee computer program after execution of at least a portion of the debuggee program, based on a call graph. The call graph may have a plurality of nodes, each node representing a corresponding event that occurred during an execution of the debuggee program. Some nodes may represent function calls and have a corresponding machine address and a source language statement. The mechanism may include selectively forming one or more clusters of nodes, each cluster corresponding to a source language statement, the nodes of each cluster corresponding to the source language statement of the cluster.

In one embodiment, in response to a command to perform a step operation, a process may selectively perform a step operation that includes two or more nodes, based on whether the two or more nodes are clustered together. Nodes of a cluster may be combined when performing a step operation.

In one embodiment, a determination of whether to cluster two nodes may be based on a comparison of the respective machine addresses of the nodes. If the machine instructions corresponding to the nodes have a common corresponding source language statement, and the machine instruction occurring later in a sequence of instruction executions has a greater machine address than the other machine instruction, their corresponding nodes may be clustered together; if the machine instruction occurring later in a sequence of instruction executions has a machine address less than the other machine instruction, their corresponding nodes may be restricted from being clustered together.

In one embodiment, two nodes having a common corresponding source language statement and a common machine instruction may be clustered together if they represent different event types and not clustered together if they each represent the same event type.

In one embodiment, a variable value stored in association with an event may be selectively propagated to a later event based on a static analysis of the debuggee program, the static analysis determining whether the variable value may have changed between the locations in the machine code corresponding to the event and the later event. The variable value may be selectively provided based on the determination of whether it may have changed.

In one embodiment, a snapshot of the debuggee program may be stored in association with a call graph node. In one embodiment, in response to a user inspecting variable values during live debugging, the inspected variable values may be stored in association with a call graph node.

In some embodiments, the call graph comprises a tree structure with nodes representing function invocations, and a cursor indicating active nodes of the tree structure, including a current active node.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1A:
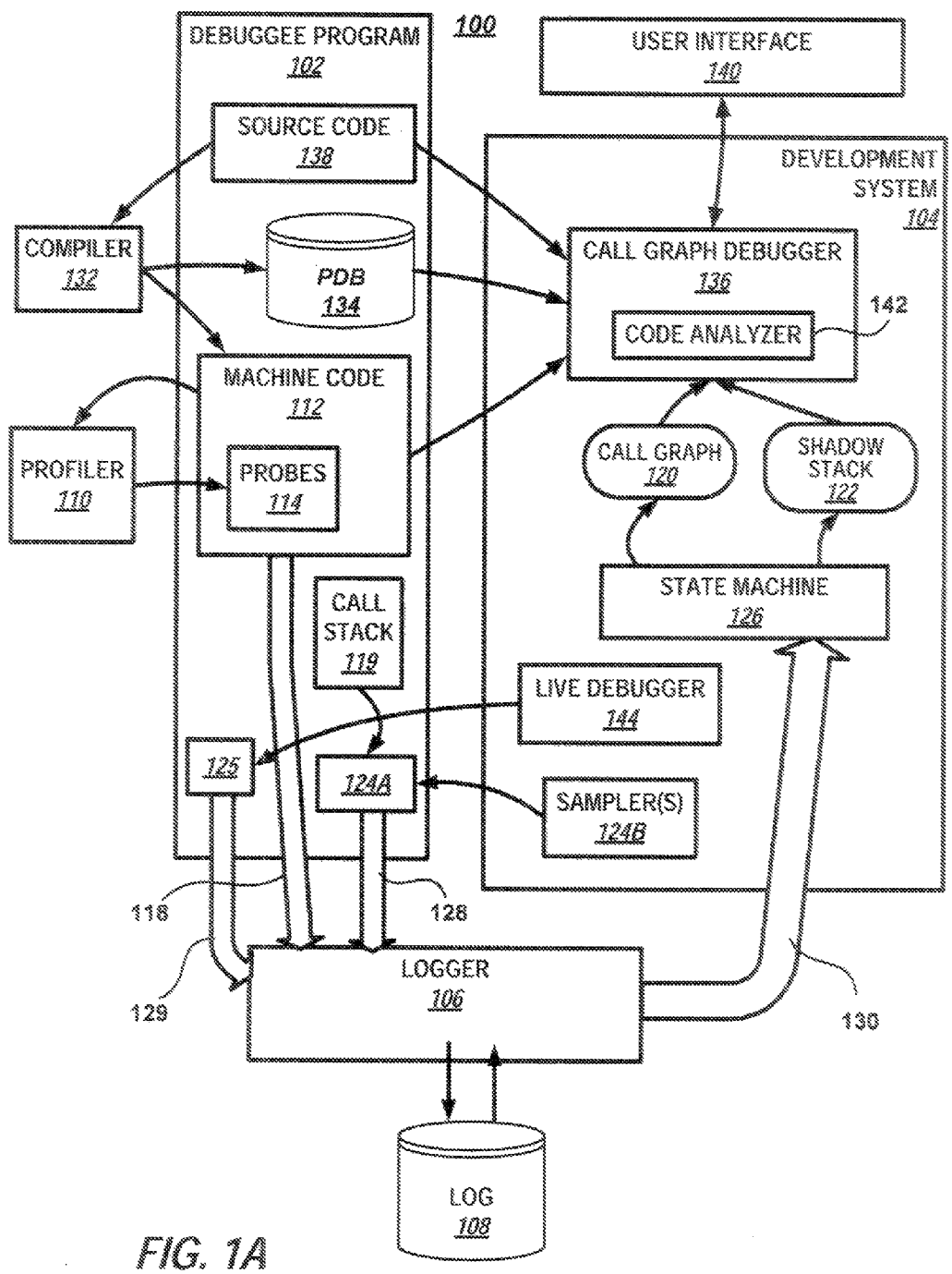
FIG. 1A is a block diagram illustrating an example embodiment of a debugging system that may be employed to debug from a call trace.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

As used herein, the term "computer program," or simply "program," refers to a computer program or a portion thereof, and may include associated data. A computer program may be an independent program, or it may be designed to provide one or more features to another application. An "add-in" and a "plug-in" are examples of computer programs that interact with and provides features to a "host" application.

A computer program is made up of any combination of program components, which may include program instructions, data, text, object code, images or other media, security certificates, scripts, or other software components that may be installed on a computing device to enable the device to perform desired functions. Program components may exist in the form of files, libraries, pages, binary blocks, or streams of data.

As used herein, the term "function" refers to a portion of code within a larger program that performs a specific task, and can execute relatively independent of other portions of the program. A function may, but does not necessarily, return a value. In various computer languages, different terms may be used, such as subroutine, method, procedure, or subprogram. As used herein, the term "function" may include any one or more of these. As used herein, "calling" a function and "invoking" a function are synonyms. A function that calls another function is referred to as a "parent function" of the other function. A function that calls itself is a parent of itself. An "instance" of a function refers to an invocation of the function. A function may have one or more instances during an execution of the computer program. As used herein, the term function refers to an instance of a function, unless it is clear from the context that it refers to the function itself.

FIG. 1A is a block diagram illustrating an example embodiment of a development environment 100 that may be employed to debug a computer program. In various embodiments, development environment 100 may be implemented with one or more computing devices configured in a variety of ways.

As illustrated, development environment 100 includes debuggee program 102, which is the computer program being debugged or analyzed. Debuggee program 102 may be represented in one or more forms. As illustrated, each of source code 138 or machine code 112 may represent debuggee program 102, or a portion thereof, in a computer language, such that there is a correspondence between statements of source code 138 and instructions of machine code 112. In some embodiments, the language of source code 138 or machine code 112 may be a language that is traditionally considered to be a high level language, such as C, C++, C#, Basic, Java, or the like. In some embodiments, the language 138 may be in a lower level language, such as an intermediate language, an interpretable language, an assembly language, native machine instructions that correspond to a processor on which they are executed, or another representation. In one embodiment, compiler 132 may translate source code 138 into machine code 112. In one embodiment, source code 138 is a high level language that is translated into machine code 112, and machine code 112 is an intermediate language. In some embodiments, source code 138 is a higher level language than machine code 112; in some embodiment, machine code 112 is a higher level language than source code 138. In some embodiments, a compiler may translate machine code 112 into a lower level machine code (not shown) prior to execution.

Program database 134 provides a mapping between debuggee program source statements and corresponding machine code instructions. Program database 134 may be implemented in a variety of ways, including direct, indirect, or composite mappings. The contents of program database may be based on the language of source code 138 or machine code 138, or a parser that identifies statements in each. In one embodiment, debuggee program 102 includes profiler 110. Profiler 110 is a component that may perform an analysis of source code 138 or machine code 112 and insert probes 114 into the machine code. A probe 114 includes one or more instructions that, when executed, cause a corresponding call trace event 118 and provide data regarding the execution of machine code 112. This data may indicate that a particular location has been reached, or that a particular function is about to be called or has just returned. Various types of probes 114 may provide data indicating additional information, such as variable values, call stack snapshots, or the like. During an execution of debuggee program 102, system functions, libraries, or other program segments that have not been generated from source code 138 or machine code 112 may be invoked. As used herein, the debuggee program includes all functions that are invoked during execution of the debuggee program.

Table 1 includes examples of call trace probes and corresponding events that may be employed. For example, a "call" event may indicate that a function is about to be invoked. It may be triggered by a corresponding call probe, and indicate the calling function and the called function. It may indicate the values of parameters passed to the called function. A call probe may be inserted prior to the actual invocation code. An "enter" probe may be inserted at or near the beginning of a function. It may trigger an "enter" event, and indicate the function that has begun execution. An "exit" probe may be inserted prior to a function return. It may trigger an "exit" event indicating the function that is about to return. A "return" probe may trigger a "return" event, indicating the called function and the caller function. It may indicate a return value of the function. A return probe may be inserted immediately after a function call, or approximately in that location. In various embodiments, other types of probes 114 may trigger corresponding events and provide other data.

TABLE 1

Call Trace Events

| Event | Probe | Data | Example Location of Probe |
|---|---|---|---|
| CALL | CALL PROBE | Caller, called function, parameters | Immediately before a function call |
| RETURN | RETURN PROBE | Caller, called function, return value | Immediately after a function call |
| ENTER | ENTER PROBE | Current function, parameters | At the beginning of a function |
| EXIT | EXIT PROBE | Current function, return value | Before each exit of a function |

In the illustrated embodiment, debuggee program 102 includes call stack 119. Call stack 119 is a run-time data structure that maintains data representing each function invoked during execution of debuggee program 102. It may include one or more frames, each frame representing an instance of an invoked active function. The sequence of frames indicates the sequence of invocations. In one invocation, the frames are ordered with the frame of the current function at the top of the stack and each frame corresponding to a function that is the parent of the function corresponding to the frame above it on the call stack.

As illustrated, development environment 100 includes development system 104. Development system 104 includes one or more computer programs and associated data that facilitate debugging of a debuggee program. Visual Studio®, by Microsoft Corporation, of Redmond, Wash., is one example of a development system, though other development systems may be employed. Thus, various development systems may be enhanced to perform the mechanisms described herein.

In one embodiment, development system 104 includes a call graph 120 and shadow stack 122. Call graph 120 is a directed graph that represents calling relationships between functions of debuggee program 102, as well as sequences of events. Some nodes of the graph represent a corresponding called function, and directed edges leading to these nodes represent an invocation of the called function from the calling function. Other nodes of the graph may represent other types of events that occurred during execution of the debuggee program, such as CHECKPOINT events. In one embodiment, a call graph is represented as a tree structure or a combination of tree structures, in which each level of the tree structure corresponds to a depth of a call stack. Shadow stack 122 is a snapshot approximation of call stack 119 at a corresponding point during the execution of debuggee program 102. It may include data indicating an approximation of the sequence of frames in call stack 119 at a particular point, based on an analysis of logged events. A shadow stack may be implemented as an ordered array of frames and an associated top-of-stack pointer, in a manner that approximately mirrors the call stack, or by various other implementations that represent a stack.

In one embodiment, development system 104 includes state machine 126. State machine 126 represents a state of the analysis of debuggee program 102 based on a stream of events 130 received from logger 106. It may also indicate transitions between states, as well as the types of events that trigger state transitions. Briefly, state machine 126 may receive a stream of events 130 that includes call trace events and sample trace events previously logged, and update call graph 120 or shadow stack 122 based on these events.

In one embodiment, development system 104 includes one or more samplers 124*b*. During execution of debuggee program 102, a sampler may cause an event that triggers a snapshot of call stack 119, enabling the snapshot to be stored in log 108 for use during a subsequent analysis. A sampler 124*b* may include program instructions or data that indicate when or how a CHECKPOINT event is to be triggered. One type of sampler may specify that a CHECKPOINT event is to be triggered based on a number of call trace events that have occurred. For example, it may indicate that a CHECKPOINT event is to be triggered after every 1000 call trace events, without a specification of a particular location in the debuggee program. One type of sampler may have a corresponding specification of a location in the debuggee program. It may be an unconditional sampler that causes an event every time the location is reached during debuggee program execution. It may be conditional, based on a number of times the location has been executed, values of one or more debuggee program variables, a number of call trace events, or other condition. Samplers may be created to trigger a CHECKPOINT event based on any of a number of program or system conditions, such as a call stack reaching a specified size, a specified system call being made, an amount of memory being allocated, or the like. One type of CHECKPOINT event may be triggered in response to an action by a user, such as pausing execution of debuggee program 102, or entering a command. In one embodiment, samplers have a component associated with development system 104, labeled as sampler 124b herein, and a corresponding component associated with debuggee program 102, labeled as sampler 124a herein. Sampler 124a may include instructions and data to trigger a CHECKPOINT event during execution of debuggee program 102. Sampler 124b may include instructions and data to facilitate configuration of a sampler, or control of sampler 124a.

In the illustrate example embodiment, development system 104 includes live debugger 144. Live debugger 144 may be used to perform debugging actions during execution of debuggee program 102 or at a break point during execution. In one embodiment, debuggee program 102 may include one or more debugger actions 125 that are performed as part of an interaction with a user during execution of the debuggee program or at a break point during execution. A user may control live debugger 144 may perform debugger actions 125 such as inspecting variable values, modifying variable values, or other such actions. In response, live debugger 144 may trigger a debugger actions event 129 including data such as variable values. In some embodiments, the debugger may insert this data in other types of events, such as a CHECKPOINT event.

In the illustrated embodiment, development environment 100 includes logger 106 and log 108. Logger 106 provides an interface to log 108. Logger 106 may receive call trace events 118 or sample trace events 128 from debuggee program 102 and store the corresponding information in log 108. Logger 106 may receive requests for data and retrieve the requested data from log 108. Log 108 may be implemented as a database, a file, an event stream or queue, or another structure that provides storage and retrieval of data. The receipt of an event or data by logger 106 is referred to as "logging" the event or data.

TABLE 1, discussed above, describes examples of call trace events 118 that may be triggered by corresponding probes 114. In one embodiment, logger 106 may receive each of these events and store the corresponding data to log 108. Samplers 124 may trigger CHECKPOINT events 128. In response to CHECKPOINT event 128, a snapshot of the call stack 119, or a portion thereof, may be taken and stored by logger 106. In one embodiment, storing data corresponding to a call trace event or a CHECKPOINT event includes storing an identification of one or more debuggee program variables and corresponding values.

In one embodiment, inspection of debuggee program variables by a user at a program break point may cause an INSPECTION event and a corresponding INSPECTION node with the inspected variable names and values. In some embodiments, a user may modify one or more program variable values at a break point, and the modified values may be included in INSPECTION events and corresponding nodes. An INSPECTION event is an example of a debugger action event 129, which occurs in response to an interaction with the debugger during debuggee program execution and live debugging. In one embodiment, the data of an INSPECTION event may be combined with a CHECKPOINT event, and the associated data stored in a corresponding CHECKPOINT node.

In one embodiment, logger 106 may maintain a temporal ordering of events. This may be implemented by storing a timestamp corresponding to each event. It may be implemented by maintaining a counter and incrementing it for each event. The ordering may be maintained by various other data or storage mechanisms. The ordering enables logger 106 to retrieve a set of events in their proper sequence, or to retrieve a set of events in a specified interval.

In the illustrated embodiment, development system 104 may include call graph debugger 136, which may receive call graph 120 and process commands. The commands may include commands to perform a single step, go to a specified context, return variable values, or other debugging commands. Call graph debugger 136 may also receive shadow stack 122 and use the data therein to perform its operations. Program database 134 may provide input to call graph debugger 136. Call graph debugger 136 may include or communicate with code analyzer 142. Code analyzer 142 may perform a static analysis of debuggee program 102 to determine control flow, variable scope, or other static analysis determinations.

In one embodiment, development environment 100 includes user interface 140, which may be a graphical user interface or other type of interface. Call graph 120 or shadow stack 122 may be displayed as a portion of user interface 140. User interface 140 may communicate with call graph debugger 136, issuing commands and receiving data in response.

Figure 9:
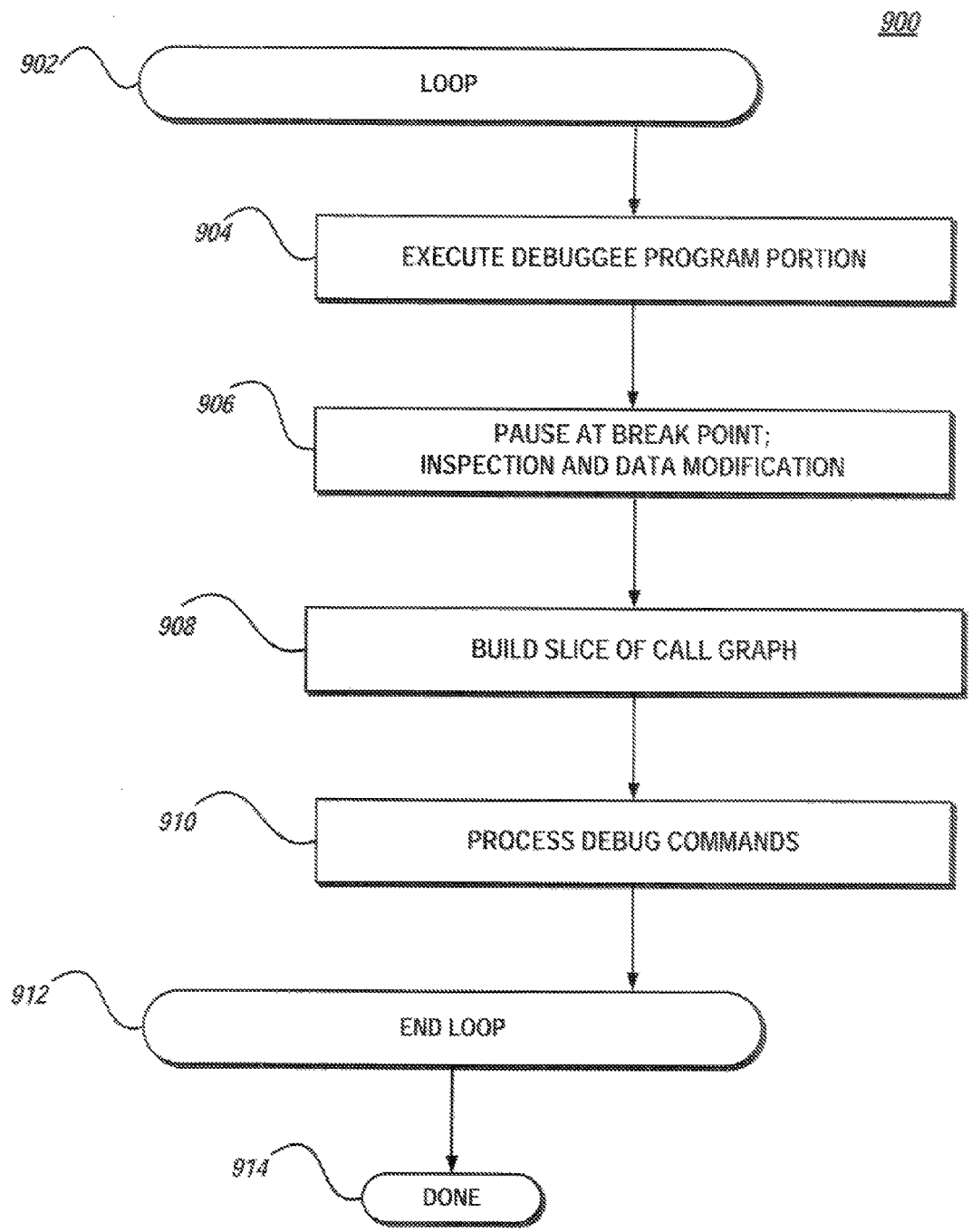
FIG. 9 is a flow diagram illustrating a process of debugging a debuggee program.

Portions of development environment 100 may be implemented as one or more computing devices, or as computer software executing on one or more computing devices. FIG. 9 illustrates one embodiment of a computing device that may be used to implement development environment 100 or portions thereof. The various components illustrated in development environment may be divided or combined in a variety of ways. For example, in one implementation, the functions of live debugger 144 and call graph debugger 136 may be integrated into one component or share a common user interface.

FIG. 1A is only an example of a suitable environment and is not intended to suggest any limitation as to the scope of use or functionality of the present invention. Thus, a variety of system configurations may be employed without departing from the scope or spirit of the present invention.

Figure 1B:
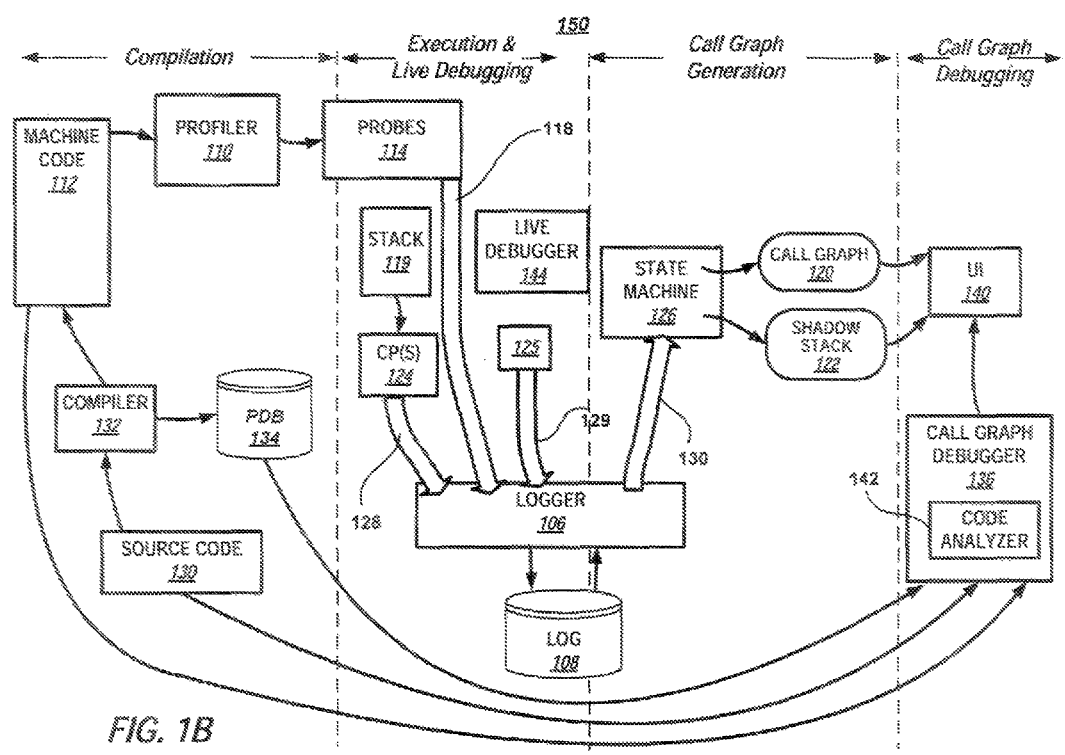
FIG. 1B is a timing diagram showing an example embodiment of the debugging system of FIG. 1A together with actions in multiple phases.

FIG. 1B is a timing diagram 150 illustrating the components of development environment 100 arranged to show a flow of actions and data movement. Timing diagram 150 is divided by vertical dashed lines into four sections, representing a compilation phase, an execution and live debugging phase, a call graph generation phase, and a call graph debugging phase. It is to be noted that in various embodiments, these phases may be in a different order, overlap, or iteratively transition between phases. However, for illustrative purposes, the system is shown in four distinct phases.

In a compilation phase, profiler 110 may process machine code 112 to insert probes 114, as discussed herein. In some embodiments, compilation may be performed in stages, or a just-in-time compilation may be performed such that probe insertion may occur just prior to the first execution of each function.

In an execution and live debugging phase, machine code 112 may be executed, causing probes 114 to trigger call trace events 118. The data corresponding to call trace events may be sent to logger 106 for storage in log 108. Also during the execution phase, samplers 124 may trigger CHECKPOINT events 128, causing data from call stack 119 to be sent to logger 106 for storage. In the execution and live debugging phase, execution of the debuggee program may pause at a break point. A user may control live debugger 144 to inspect and modify variable values. This is referred to as "live debugging." In one embodiment, live debugging may cause debuggee action events 129 to occur during the execution and live debugging phase. Call trace events 118, CHECKPOINT events 128, and debuggee action events 129 that occur as part of the execution of machine code 112 are referred to as "live" events. During processing by the state machine after logging, these events are referred to as "logged" events, to clarify the distinction between handling an event during debuggee program execution and subsequent processing of the event during call graph generation or call graph debugging.

In a call graph generation phase, the logged events may be retrieved by state machine 126 to generate call graph 120 and shadow stack 122. In one embodiment, generation of call graph 120 includes retrieving variable values stored in the log and associating variable values with respective nodes of the call graph that correspond to events when the values were logged during debuggee program execution. Similarly, in one embodiment, call stack snapshots that were logged in response to CHECKPOINT events or other events may be included with or associated with call graph 120 in a manner that associates each snapshot of the call stack with a node that corresponds to the CHECKPOINT event or other event.

In a call graph debugging phase, a representation of the call stack or shadow stack may be displayed or otherwise presented to a user as part of user interface 140. UI 140 may include, for example, a display on a computer monitor. The call graph debugging phase may include interaction between UI 140 and call graph debugger 136. UI 140 may issue commands to call graph debugger 136. In response, call graph debugger 136 may perform actions and return responses to UI 140.

In some embodiments, these actions of FIG. 1B may be performed iteratively, such that a user may view the call graph or shadow stack at various times during execution of a debuggee program. In some embodiments, the execution of the debuggee program may be performed prior to beginning generation of the call graph or shadow stack. These phases may be controlled by one user or different users working sequentially or concurrently. In one embodiment, at least some of the actions of the state machine may be performed concurrently with execution of the debuggee program, so that the call graph may be sent to logger 106 and written to log 108. In one embodiment, during an execution and live debugging phase, a portion of the debuggee program may be executed and paused. The user may interactively inspect or modify program variables. Actions of the live debugging phase may be performed based on a slice of a call graph that is generated based on the executed portion of the debuggee program and the user interactions. The system may perform another iteration of the execution and live debugging phase, and repeat this process numerous times. FIG. 9 illustrates an iterative process that interleaves the execution and live debugging phase with the call graph debugging phase.

Figure 2:
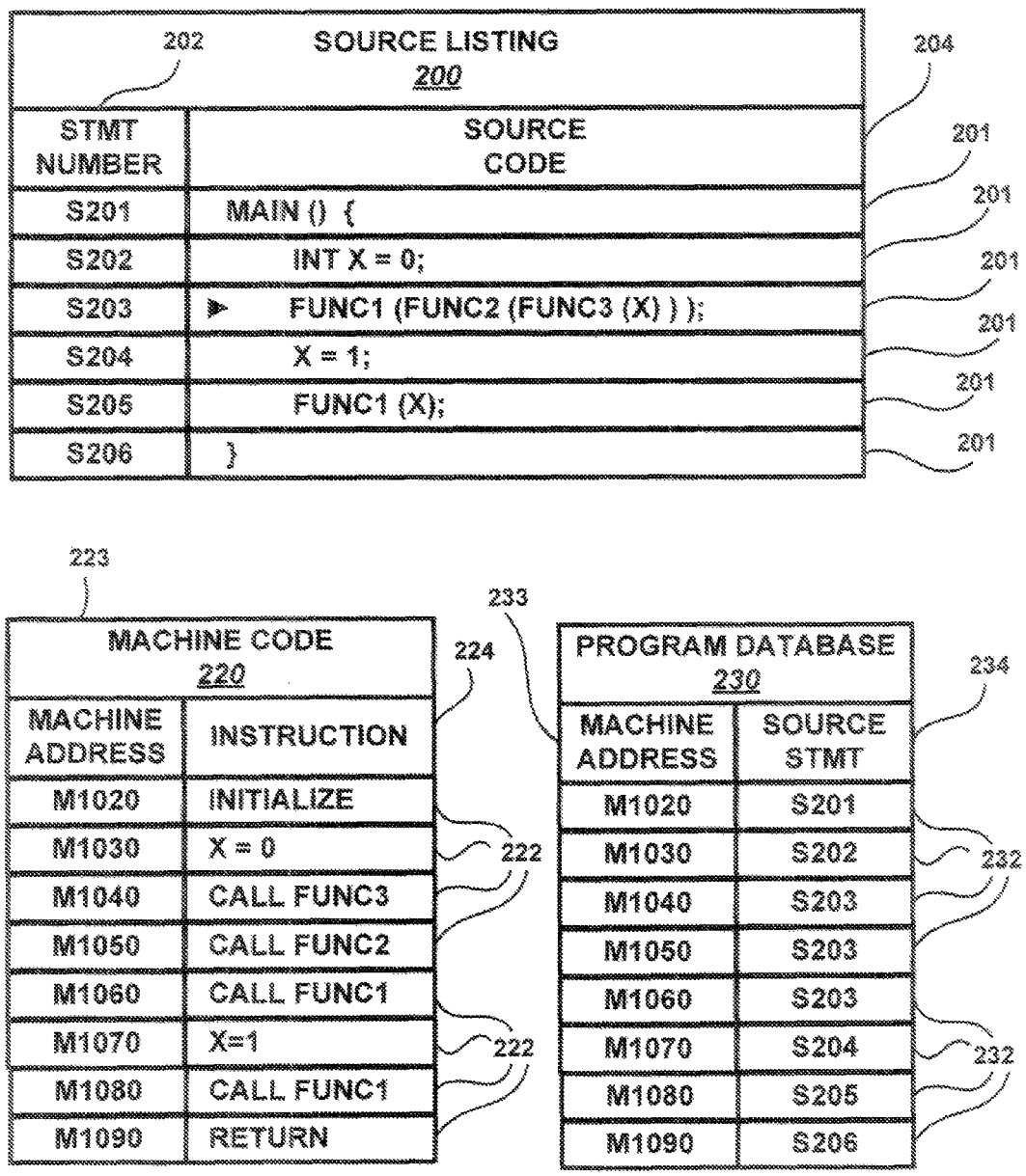
FIG. 2 illustrates an example of a debuggee program segment and corresponding components that illustrate a portion of the mechanisms described herein.

FIG. 2 illustrates an example of a debuggee program segment and corresponding components that illustrate a portion of the mechanisms described herein. FIG. 2 includes an example source listing 200 that represents a portion of a debuggee program 102, of FIGS. 1A-1B. Machine code 220 is a corresponding example of machine code 112 that may be generated from source listing 200. Program database 230 is a corresponding example of a portion of program database 134 that contains relationships between machine code 220 and source listing 200.

Source listing 200 includes a table with source language statements that are listed in a source code column 204. Each source listing row 201 includes a statement and has a corresponding statement number listed in a statement number column 202. In this example, each statement corresponds to one line of source code. However, various debuggee programs may have statements that span multiple lines of source code, or single lines that contain multiple statements. Some source language statements may comprise multiple sub-statements, such that other statements may be included between the sub-statements. For example, a loop statement may have a loop begin sub-statement and a loop end sub-statement. In some embodiments, it may be desirable to divide a source language statement into sub-statements to facilitate debugging. As used herein, the term source language statement may refer to a sub-statement. Statement numbers used herein are preceded by the letter "S" to avoid confusion with reference numbers.

Machine code 220 is presented as a table showing machine code instructions in an instruction column 224. Each machine code instruction has a corresponding machine address listed in a machine address column 223. A machine address may be indicated in any of a number of ways. It may be an absolute address or an address relative to a base address, such as an offset from the beginning of a function. In one embodiment, a machine instruction may span an address range, such as address 1020-1028. In this example embodiment, a single numeric value representing the location of the beginning of a machine code instruction is used as the machine address. Each machine code entry 222 includes an instruction and a corresponding machine address. The illustrated instructions represent the functionality of a function, though they are not necessarily illustrated as an instruction in a particular machine code language. The example machine addresses used herein are preceded by the letter "M" to avoid confusion with reference numbers.

Program database 230 provides a mapping between debuggee program source statements and corresponding machine code instructions. In the illustrated example, a machine address column 233 includes machine addresses from machine code 220; a source statement column 234 includes source statement numbers from source listing 200. Each row 232 of the table includes a machine address and its corresponding source statement number. It is noted that in this example, the machine instructions at machine addresses M1040, M1050, and M1060 each correspond to statement number S203.

Figure 3A:
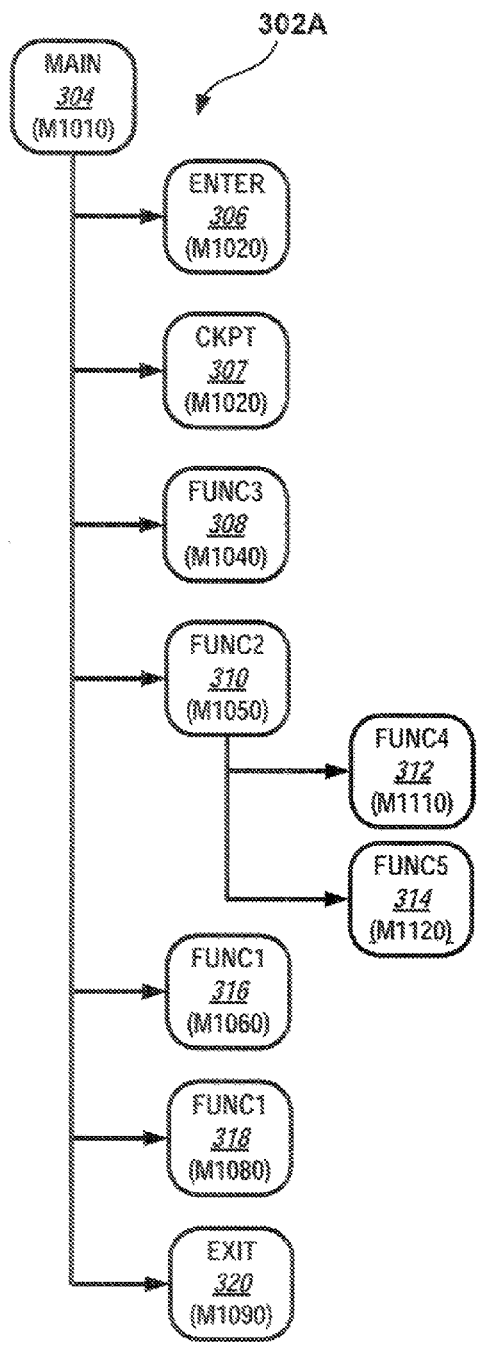
FIG. 3A illustrates an example call graph that may be generated by executing a debuggee program that includes the program segment represented in FIG. 2.

FIG. 3A illustrates an example call graph 302A that may be generated by executing a debuggee program that includes the program segment represented in FIG. 2. There are many variations of such a call graph, though the example of FIG. 3A serves to illustrates some of the mechanisms described herein.

Call graph 302A includes nodes 304-320. Each node corresponds to an event that may have occurred during an execution of a debuggee program. Each node indicates the type of corresponding event, a reference number, and a corresponding machine address. Nodes may include additional data corresponding to an event, such as variable values, call stack snapshots, or the like. Nodes that represent function call events are named as the name of the function that is being called; other types of nodes are named by the type of event they represent. Some of the machine addresses correspond to machine addresses shown in machine code 220 or program database 230.

MAIN node 304 represents an event of calling function main( ). ENTER node 306 represents an event of beginning function main at a corresponding machine instruction at machine address M1020. CHECKPOINT node 307 represents a CHECKPOINT event that also occurred at the beginning of function main( ), and also has a corresponding machine instruction at address M1020. A CHECKPOINT node may include data such as a snapshot of the debuggee program call stack at the time of the corresponding CHECKPOINT event. FUNC3 node 308 represents an event of calling function func3 at a corresponding machine instruction at machine address M1040. FUNC2 node 310 represents an event of calling function func2 at a corresponding machine instruction at machine address M1050. FUNC1 node 316 represents an event of calling function func1 at a corresponding machine instruction at machine address M1060. EXIT node 320 represents an event of exiting function main( ) at a corresponding machine instruction at address 90.

FUNC4 node 312 and FUNC5 node 314 represent calls from within func2( ) to func4( ) at machine address M1110 and func5( ) at machine address M1120, respectively. These machine instructions are not illustrated in machine code 220. These nodes illustrate the tree structure of the example call graph 302A.

Figure 3B:
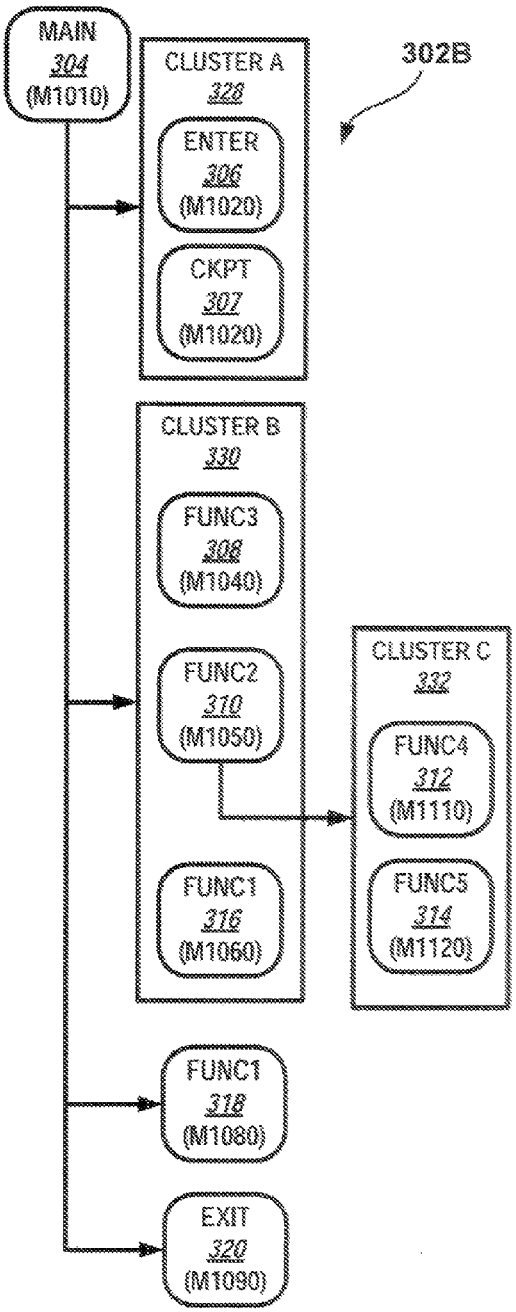
FIG. 3B illustrates clusters that may be formed based on the call graph of FIG. 3A and the portions of a debuggee program illustrated in FIG. 2.

Mechanisms described herein may be used to cluster multiple nodes of a call graph, where the cluster of nodes corresponds to an execution of machine instructions that correspond to a debuggee program source code statement. FIG. 3B illustrates three clusters that may be formed based on call graph 302A and the portions of a debuggee program illustrated in FIG. 2. Call graph 302B illustrates a transformation of call graph 302A, in which three clusters have been formed. Cluster A 328 contains ENTER node 306 and CHECKPOINT node 307, each node having the same corresponding machine address of M1020. Cluster B 330 contains FUNC3 node 308, FUNC2 node 310, and FUNC1 node 316, having respective machine addresses of M1040, M1050, and M1060. As shown in program database 230, each of the machine addresses of cluster B corresponds to source code statement S203. Source listing 200 shows source code statement S203 including calls to each of func3( ), func2( ), and func1( ). Machine code 220 includes calls to each of these functions at respective addresses M1040, M1050, and M1060.

As discussed in more detail herein, clustering of nodes in a call graph facilitates single stepping in a development system during a call graph debugging phase. Thus, in the example source listing 200, a debugger may allow a user to enter a command to perform a single step. A single step performs an action to simulate execution of the debuggee program until the next call graph event that is not on the current statement. For example, the debugger may show current statement S201, corresponding to ENTER node 306. A subsequent single step brings the current statement to cluster B 330, representing the machine instructions corresponding to statement S203. A subsequent single step brings the current statement to FUNC1 node 318, corresponding to statement S205. By clustering the three nodes, the debugger avoids performing three single steps at the same source code statement. It is to be noted that, in some embodiments, performing single steps through the debuggee program segment of FIG. 2 does not include stepping at source code statements S202 and S204, because these statements do not have corresponding events. However, in some embodiments, mechanisms may include events that correspond to statements such as these.

Clusters may be formed at any level of a call graph. In the example of FIG. 3B, cluster C 332 groups together FUNC4 node 312 and FUNC5 node 314. This cluster is at a lower level of the call graph than cluster B 330 (considering the root as the highest level). In a debug system, a user may have an option of stepping into a called function or stepping over it. A node that is not combined with other nodes is considered to be a cluster of one node. As used herein, the term cluster refers to a group of one or more nodes of the call graph.

Figure 4:
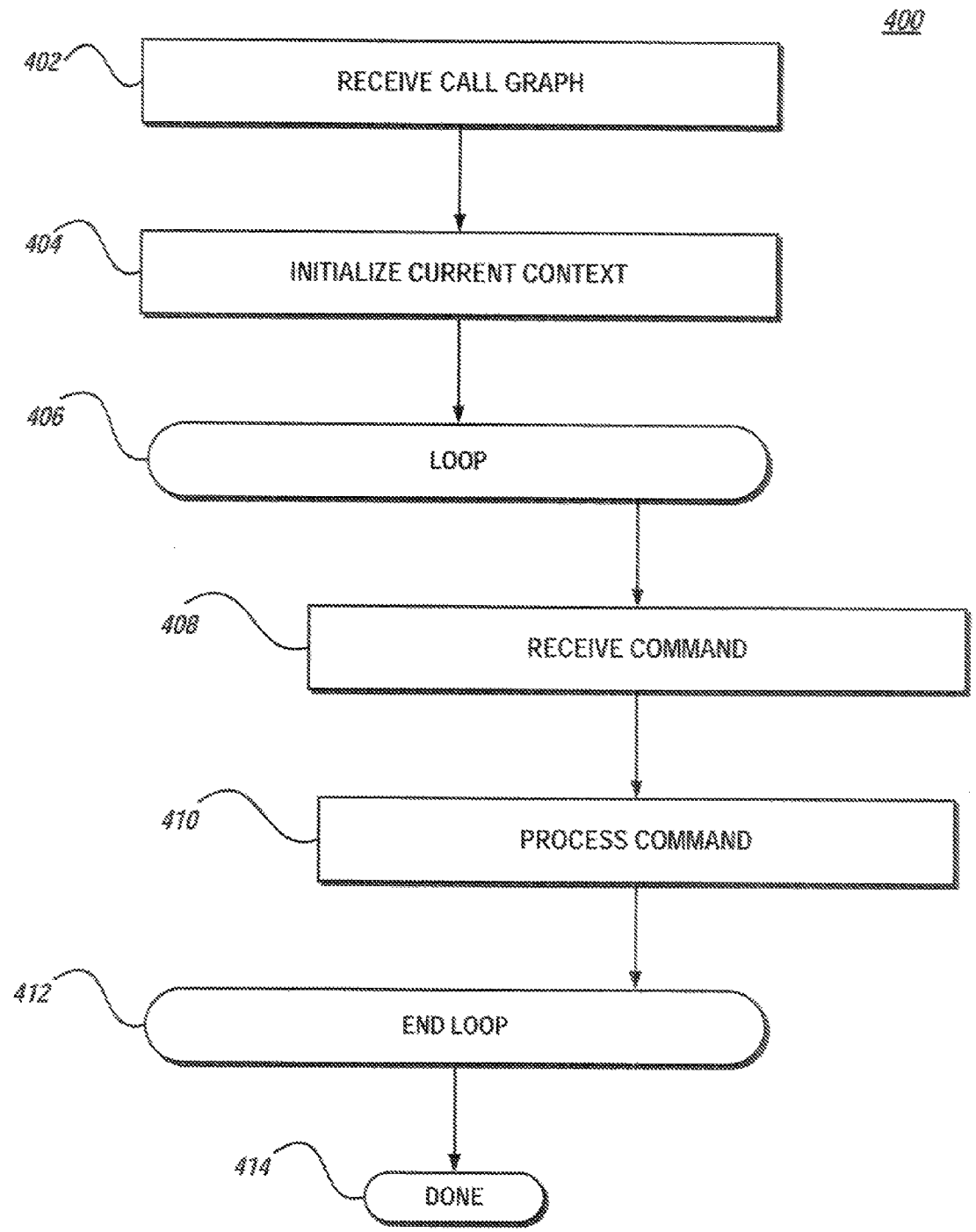
FIG. 4 is a flow diagram of a process of debugging a debuggee program from a call graph.

FIG. 4 is a flow diagram of a process 400 of debugging a debuggee program from a call graph. In one embodiment, process 400 may be performed as part of the live debugging phase described herein. In one embodiment, the actions of process 400, or a portion thereof, are performed by call graph debugger 136 or other components of development system 104, of FIG. 1A, or variations thereof.

The illustrated portions of process 400 may be initiated at block 402, where a call graph is received. The call graph may have been generated by portions of development environment 100 and stored in a log, or by other means. The call graph may have been generated by state machine 126. In one embodiment, receiving a call graph includes receiving one or more shadow stack snapshots, which may be integrated into the call graph or maintained separately.

The process may flow to block 404, where a current context is initialized. A context may include identification of one or more of a node in the call graph, a machine code address, a source code statement, or a snapshot of the shadow stack. The current context may be used to identify a current location while traversing the call graph or an execution of the debuggee program. The user interface may enable a user to select a particular context to begin debugging, or may default to a configured location.

Figure 5:
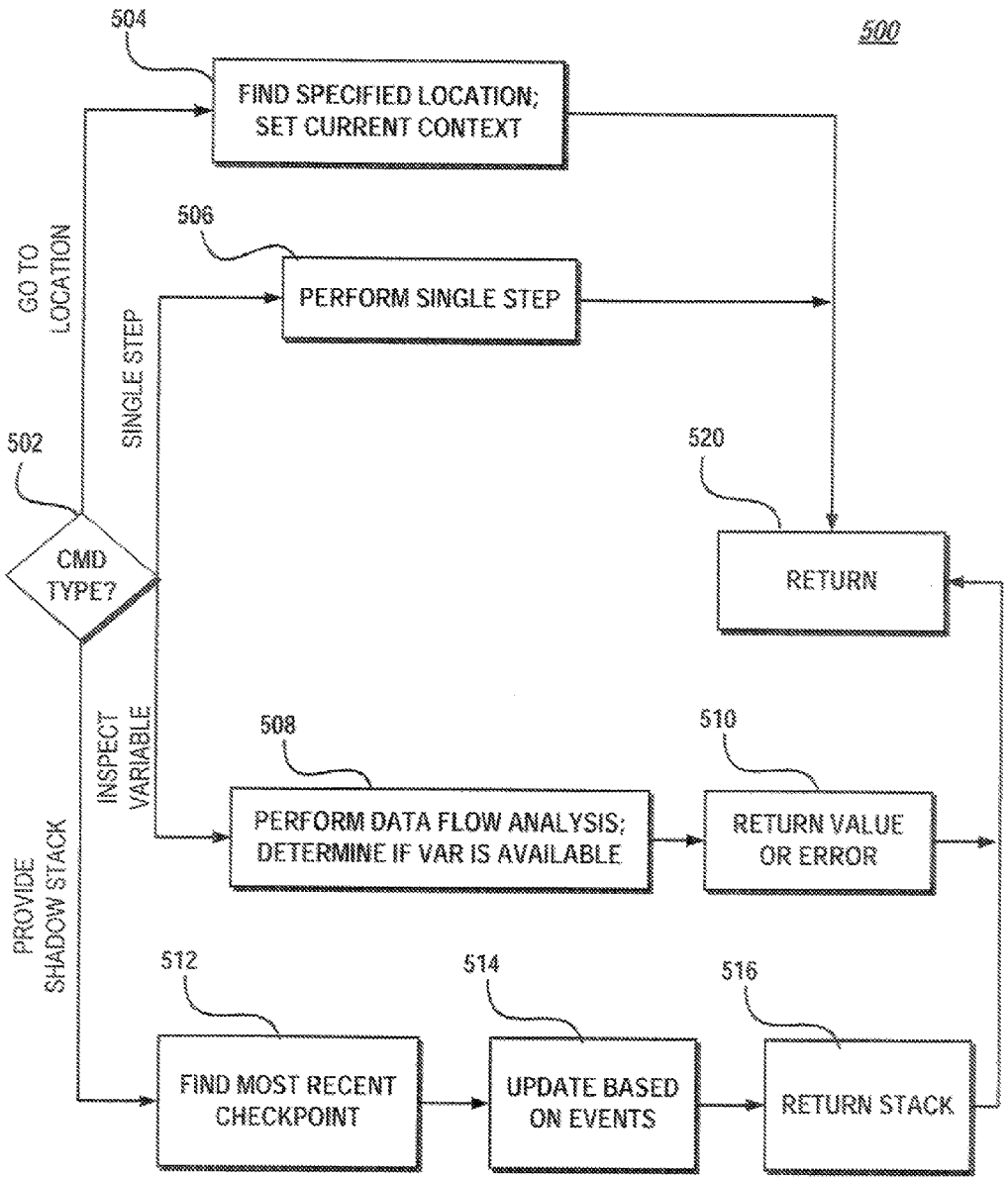
FIG. 5 is a flow diagram illustrating a process for processing a debugger command.

The process may flow to loop 406. Loop 406 begins a loop that iterates for each command received from call graph debugger 136. The commands may be directly or indirectly initiated by a user, or may result from other logic or configuration of the call graph debugger. The command may be any one or more selected from a set of commands that the user interface may send to call graph debugger 136. The process may flow to block 408, where a command is received. The process may flow to block 410, where the received command is processed. FIG. 5 illustrates, in further detail, an embodiment of processing the received command. Processing of some commands may result in a change to the current context.

The process may flow to block 412, which terminates loop 406. Loop 406 may iterate until a command to exit is received from call graph debugger 136, the end of the call graph is reached, or as a result of another action. The process may flow to done block 414, and exit or return to a calling program.

FIG. 5 is a flow diagram illustrating a process 500 of processing a call graph debug command. In one embodiment, process 500 may implement at least some of the actions of block 410 of FIG. 4. Process 500 may begin at decision block 502, where a determination is made of the type of command that is being processed. A number of command types may be processed, though FIG. 5 illustrates processing of four command types.

If the command is a command to go to a location, the process may flow to block 504. The location specification may include one or more of a source statement identification, machine address, call graph node identification, execution iteration, or another type of location specification. For example, a location specification may indicate an Nth iteration or a next iteration of a specified source statement or machine instruction. The actions of block 504 may include finding a node in the call graph corresponding to the specified location. The call graph may be traversed in any direction. The actions may further include setting the current context to be the context corresponding to the specified location. The process may flow to block 520, and return to a calling program, such as process 400.

Figure 6:
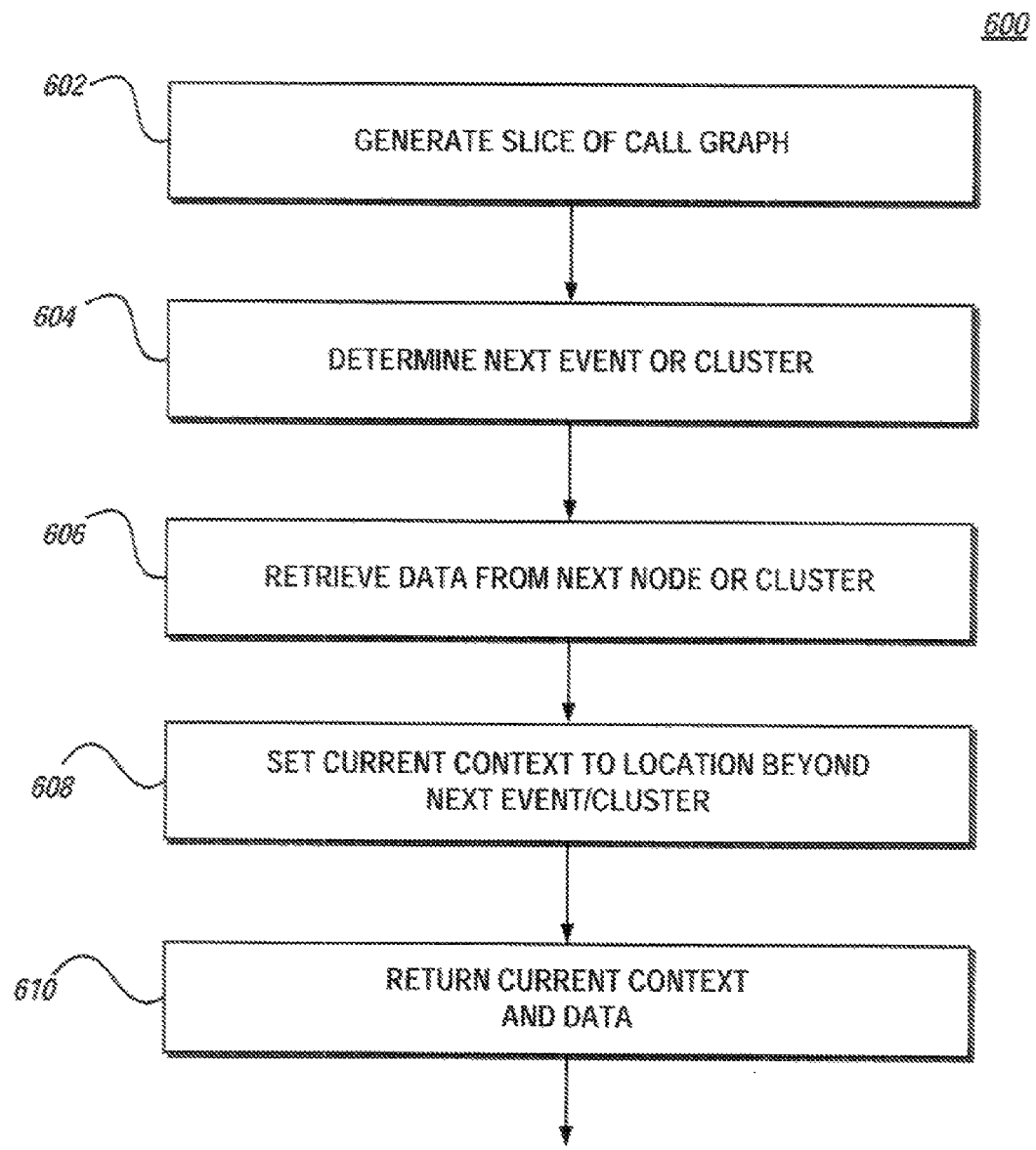
FIG. 6 illustrates an example embodiment of a process for performing a single step.

If, at decision block 502, it is determined that the command type is a single step command, the process may flow to block 506, where a single step is performed. FIG. 6 illustrates an example embodiment of performing a single step. Performing a single step may result in setting the current context to be a new context. The process may flow to block 520, and return to a calling program, such as process 400.

If, at decision block 502, the command type is determined to be an "inspect variable" command, the process may flow to block 508. The actions of block 508 may include determining whether a specified variable value is available at the current context, and a confidence level of the known value. During debuggee program execution, in response to each event, one or more variable names and values may be recorded and associated with the event. Nodes of a call graph may include variable name-value pairs as they were recorded during execution of the debuggee program.

In some implementations, only a subset of available variables is recorded at each event. During a subsequent debugging session based on the call graph, it may be desirable to provide variable values at various points. If a specified variable was recorded at the requested point, providing the value may be performed by extracting the value from the call graph.

The actions of block 508 may include performing a data flow analysis of a source code segment or a machine code segment to determine whether a recorded variable value is available or valid at the current context. A variable value may be unavailable if the variable is not in scope at the current context, as may be determined by an analysis of the source code. A value may be unavailable if it is changed, or may have been changed by an instruction that falls after the variable value was recorded and before a point where it is requested. In some debuggee program segments, it may not be known whether the variable was changed prior to the point of a value request.

In one embodiment, variable values are conditionally propagated across clusters based on a static program control flow analysis. Beginning at a node having one or more associated variable values, a process may traverse the clusters of the call graph. At each next cluster, a static control flow analysis may be performed to determine, for each variable known at the previous node, whether the variable has been assigned a new value or whether a control flow existed that may have resulted in a change of the variable. In one embodiment, code analyzer 142 may perform at least some of the data flow analysis functions. If the variable has not been assigned or such a control flow is not determined, the variable name and value may be propagated to the next cluster. In one embodiment, an analysis may determine whether the variable may be modified by other threads of execution. If such a modification may be performed, the variable may be restricted from modification. The result is a set of nodes or clusters that have enhanced variable value associations. This facilitates providing variable values at various points based on the call graph data.

A static flow analysis may be inconclusive as to whether a variable's value has changed. In some implementations, where it may not be inferred whether a variable's value is known, the value may be provided with a status indicating uncertainty. In some embodiments, if it is not inferred that the value is known and has not changed since it was recorded, the value is not provided. In some embodiments, the sequence of events in the call graph may indicate whether a conditional control flow occurred. Thus, the combination of trace events and static flow analysis may be used to determine whether to propagate a variable's value.

A variable's value may be propagated in a forward or reverse direction. For example, in a source code segment of:
S100 x=y;
S101 func1 (0);
S102 func2 (x);

At statement S101, the value of x may be unavailable to propagate from a previous statement, but if it is stored in association with the call to func2( ) at S102, it may be inferred that the value at S102 may be propagated in reverse to statement S101, therefore providing the value of x as set at S100.

Control flow analysis may also provide variable values retrieved from one or more previous events based on assignments to variables. For example, in the program segment:
S120 x=func1 (1);
S130 a=b;
S140 y=x;

A return value of the function func1( ) may be retrieved from a function exit event. A static analysis of the debuggee program may determine that the return value was assigned to the variable x. It may further determine that the value of x was assigned to the variable y without any reassignment to the variable x. Therefore, at an event corresponding to statement S140, the values of variable x and variable y may be known, based on the exit event and the static analysis.

Process 500 may flow to block 510, where a return result may indicate the variable's value. It may indicate whether a value is known with certainty or is uncertain. The process may flow to block 520, and return to a calling program, such as process 400. Though the embodiment illustrated in FIG. 5 shows a data flow analysis regarding a variable being performed in response to a request for the variable, in various embodiments an analysis may be performed at various times, such as when the current context is set to a function invocation, when a call graph is received, or even before receiving the call graph.

If, at decision block 502, it is determined that the command is a request for the shadow stack, the process may flow to block 512. At block 512, the process may find the most recent call stack snapshot, or the most recent at the level of the current context, that occurred as a result of a sampler. As discussed herein, call stack snapshots may be integrated with a call graph, or may be maintained separately with data to indicate a correspondence between call graph nodes and snapshots. Call graphs 302A-B include an example CHECKPOINT node 307, indicating a CHECKPOINT event and associated snapshot that occurred at machine address M1020. A command to provide a stack snapshot at a subsequent context may result in finding this CHECKPOINT event and associated snapshot. This snapshot may thus be provided to the call graph debugger and presented to a user.

In one embodiment, the process may flow to block 514, where the shadow stack may be optionally updated. In some embodiments, a snapshot that is not current may be enhanced based on call graph events. For example, if the most recent stack snapshot is associated with CHECKPOINT node 307 and a stack snapshot is requested at the context of cluster C 332, the process may infer that a current invocation of func2( ) exists, because cluster C represents events occurring within func2( ). Therefore, the process may include adding func2( ) to the top of the shadow stack and providing the modified shadow stack to the call graph debugger. Similarly, if the system may infer that an invoked function has exited, the corresponding instance of the function and all frames above it may be removed from the stack snapshot and provided to the call graph debugger.

The process may flow to block 516, where a snapshot of the shadow stack is returned. In some configurations, a shadow stack may be indeterminate as the result of execution since the most recent CHECKPOINT event. In some embodiments, an indeterminate shadow stack may be provided to the call graph debugger, with a status to indicate that it is indeterminate. This may be presented to the user with an indication of this status. The process may flow to block 520, and return to a calling program, such as process 400. A stack snapshot may be retrieved from a call graph node that is located after the node of the current context, propagated backward, and optionally modified in a similar manner.

FIG. 6 is a flow diagram of a process 600 of performing a single step. The embodiment illustrated in FIG. 6 combines actions that may be performed in the call graph generation phase and the call graph debugging phase of FIG. 1B. Process 600 may implement at least part of the actions of block 506 of FIG. 5. Process 600 may begin at block 602, where a slice of the call graph may be generated. In one implementation, this may be a minimal slice that includes a sequence of events and is sufficient to determine a next step. It may include a portion of the call graph including nodes proximate to the current node. If the step is in a forward direction at the current level, the slice may include one or more nodes or a cluster at the current level and any descendent nodes. If the step is in a reverse direction, it may be the previous nodes or cluster and descendent nodes. If the step is a "step in" to a lower level of the call graph, the slice may include sufficient nodes at the lower level to determine the next step. For example, in the call graph of FIG. 3, if FUNC3 node 308 is the current context, a slice in a forward direction may include FUNC3 node 308, FUNC2 node 310, FUNC1 node 316, and child nodes FUNC4 node 312 and FUNC5 node 314.

Figure 7:
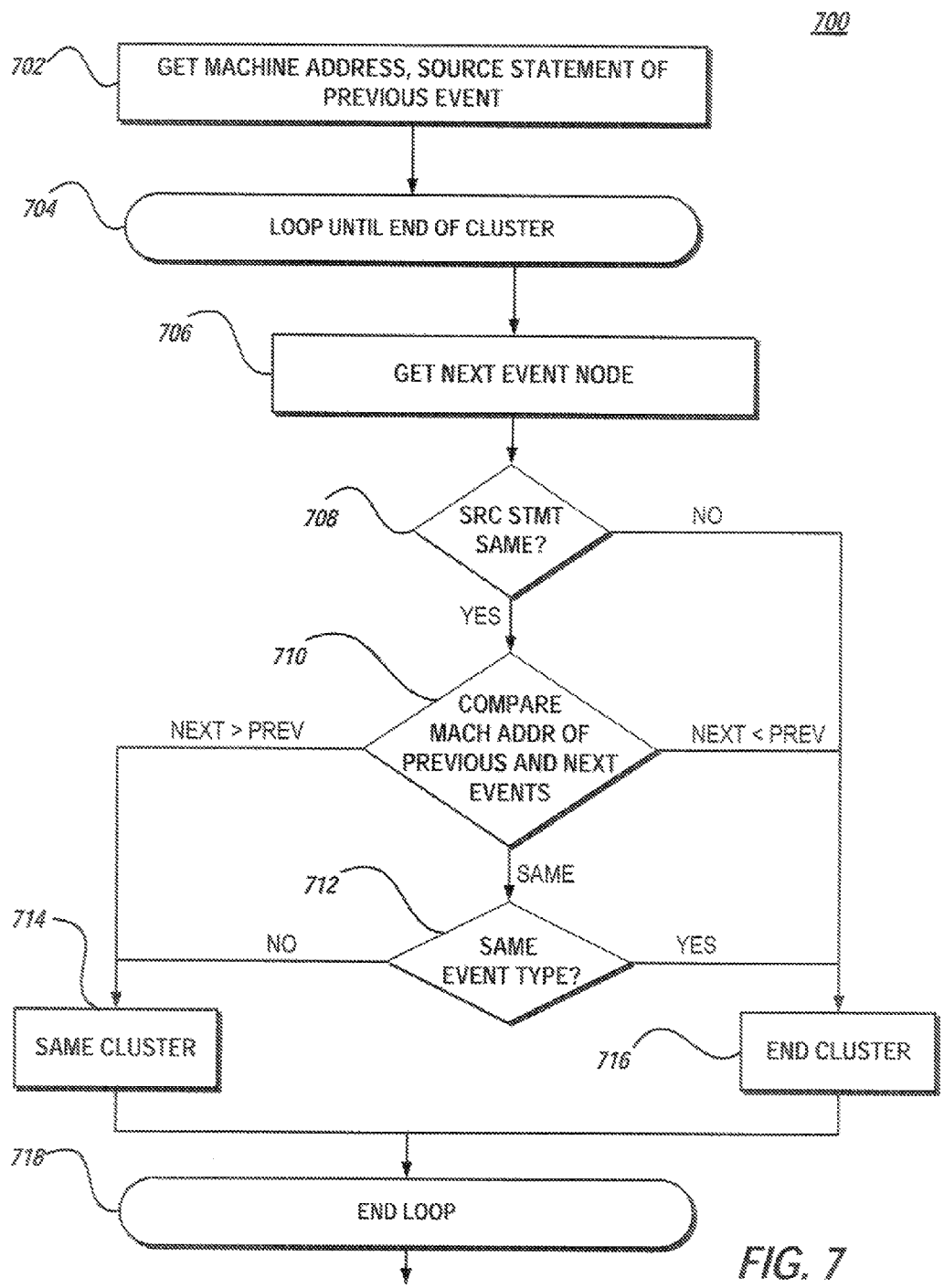
FIG. 7 is a flow diagram illustrating a process for determining a cluster of nodes from a call graph.

The process may flow to block 604, where a next event or cluster may be determined. In the above example, the process may determine that cluster B 330 is the next cluster, so that a next step would include processing this cluster. A subsequent next step may determine that FUNC1 node 318 is a cluster of one node for the next step. FIG. 7 illustrates a process for determining a cluster of nodes.

The process may flow to block 606, where data from the next node or cluster of nodes may be retrieved. This data may include variable values, a shadow stack snapshot, or other data associated with the nodes that make up the next step.

The process may flow to block 608, where the current context may be set to a location beyond the next node or cluster. This maintains the current context as the next context in the execution sequence of the call graph debugger program. In the above example using FIG. 3, the current context may be set to indicate FUNC1 node 318 as the next node. In one implementation, the current context may be maintained to be the most recently processed cluster.

The process may flow to block 610, where the current context and data retrieved at block 606 may be returned to a calling program or to the call graph debugger. This provides, for example, variable values that may have been associated with the one or more nodes that have just been processed during the stepping operation.

FIG. 7 is a flow diagram illustrating a process 700 for determining a cluster of nodes from a call graph. Process 700 may implement at least a part of the actions of block 604 of FIG. 6. Process 700 may begin at block 702, where the machine address and source statement corresponding to the previous event is retrieved. In one embodiment, the machine address may be retrieved from the event node in the call graph, and the source statement identification may be retrieved from program database 134 (FIG. 1). The identification of the source statement may be dependent on the parser that was used to identify statements prior to storing mappings in program database 134.

The process may flow to loop 704. Loop 704 begins a loop that iterates for each next event node until the end of the cluster is found. In the illustrated embodiment, loop 704 includes blocks 708-718.

The process may flow to block 706, where the next event node may be retrieved from the call graph. In one embodiment, the nodes of the call graph have a temporal ordering corresponding to an execution of the debuggee program. The next event node may be the next node in this ordering. In one embodiment, event nodes that are at a lower level in the call graph than the current level are skipped, so that the next event node refers to the next event node at the current level, provided that a next event node exists at the current level prior to a return to a higher level.

The process may flow to decision block 708, where a determination is made of whether the source statement corresponding to the event node retrieved at block 706 is the same as the source statement corresponding to the previous event node, as retrieved at block 702. If the source statements are not the same, the process may flow to block 716, where the current cluster is ended without including the event node from block 706. This reflects logic that machine instructions having different corresponding source statements are not combined into a cluster.

The process may flow from block 716 to block 718, which terminates loop 704. At this point, the cluster is ended, so the loop exits, and may return to a calling program, such as process 600.

If, at decision block 708, it is determined that the source statements of the previous event node and the current event node are the same, the process may flow to decision block 710, where the machine addresses of the previous event node and the next event node are compared. If it is determined that the next event node's machine address is less than the previous event node's machine address, the process may flow to block 716, where the cluster is ended without including the event node from block 706. This reflects the logic that a machine instruction that is after a previous node with respect to program execution and before the previous node in machine location indicates a branching during execution, such as in a loop. In one embodiment, a cluster of event nodes does not span multiple iterations of a loop. Therefore, the cluster is ended when the machine address decreases. The process may flow from block 716 to block 718, and exit loop 704.

If, at decision block 710, it is determined that the next event node's machine address is greater than the previous event node's machine address, the process may flow to block 714, where the current cluster is continued. This reflects the logic in one embodiment that event nodes having increasing machine addresses and the same source statement are considered to be the same cluster. The process may flow to block 718, where the current iteration of loop 704 ends. The process may flow back to loop 704 and perform another iteration of the loop.

If, at decision block 710, it is determined that the next event node's machine address is the same as, or equivalent to, the previous event node's machine address, the process may flow to decision block 712, where comparison of the respective event types of the previous event node and the next event node is made. If it is determined that the event types are equivalent, the process may flow to block 716, where the cluster is ended, and to block 718, where loop 704 exits. If it is determined that the event types are not the same, the process may flow to block 714, where the current cluster is continued, and to block 718, where the current iteration of loop 704 ends. The process may flow back to loop 704 and perform another iteration of the loop.

Decision block 712 and its associated branches reflects the logic in one embodiment that two nodes of an equivalent event type having the same machine address and the same source statement indicate different iterations of a loop. As discussed above, a cluster may be considered to not include different iterations of a loop. However, different event types may correspond to the same machine address and correspond to a single iteration of a loop. FIG. 3B illustrates an example in which an ENTER event and a CHECKPOINT event each have the same corresponding machine address, and are considered to be in the same cluster, cluster A 328.

In one embodiment, process 700 may be performed by traversing a portion of the call graph in a reverse direction, so that each successive node represents an ordering that is earlier in time of execution than previous nodes. In this embodiment, the conditions that flow from decision block 710 to blocks 714 or 716 may be reversed. That is, a determination that the next node's machine address is less than the previous node's machine address would result in a flow to block 714 and a continuation of the same cluster; a determination that the next node's machine address is greater than the previous node's machine address would result in a flow to block 716 and an end of the cluster. In one embodiment, the call graph may be traversed in two directions. Beginning at a specified node, process 700 may traverse the graph in one direction until one cluster end is found, and then traverse in the opposite direction until the opposite cluster end is found.

Figure 8:
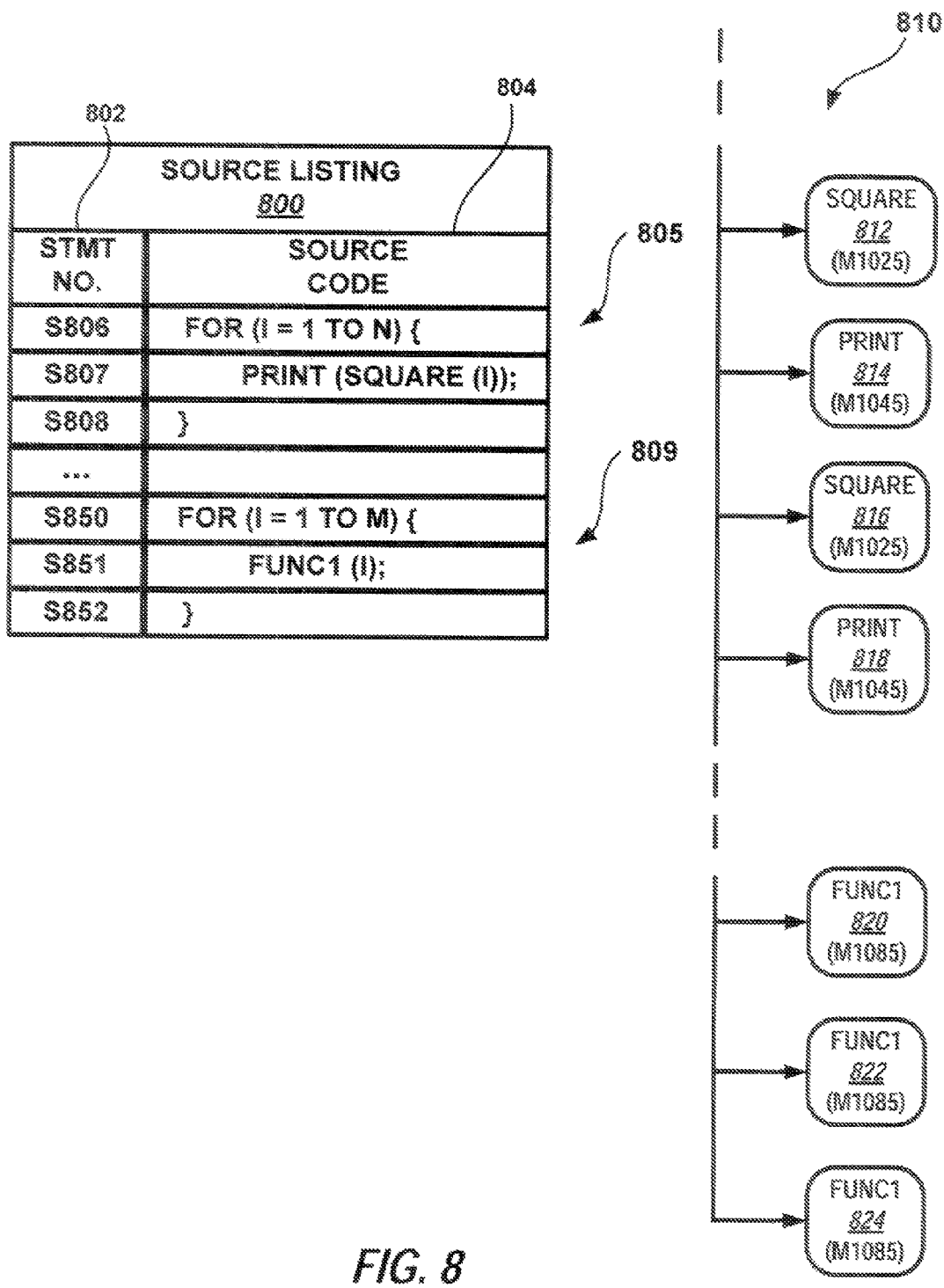
FIG. 8 illustrates examples of program loops that may be processed by the mechanisms described herein.

FIG. 8 illustrates an example of program loops that may be processed by the mechanisms described herein. Source listing 800 is an example debuggee program segment showing source code listed in source code column 804, with corresponding statement numbers listed in statement number column 802. The source code includes a first loop 805 that begins at statement number S806 and includes two function calls (square ( ) and print( )) in a single statement, at statement number S807, and a second loop 809 that begins at statement number 850 includes a single function call to func1( ) at statement number S851. The example debuggee program may include other statements not shown in this figure.

Call graph 810 is an example portion of a call graph that may correspond to source listing 800, in one implementation. Call graph 810 includes SQUARE node 812 and PRINT node 814 that represent respective function invocations during a first iteration of the first loop 805, and SQUARE node 816 and PRINT node 818 that represent respective function invocations during a second iteration of the first loop 805. SQUARE node 812 and SQUARE node 816 each have associated machine addresses M1025, indicating that the same machine instruction was executed during each iteration of the loop. Similarly, PRINT node 814 and PRINT node 818 each have associated machine addresses M1045.

FUNC1 node 820, FUNC1 node 822, and FUNC1 node 824 each have associated machine instruction with machine address M1085 indicating the same machine instruction executed during each of three iterations of the second loop 809.

In an example embodiment, when the logic of process 700 is applied to call graph 810, when processing the new event node PRINT node 814, the new event node may be found to have a greater machine address (M1045) than the previous event node SQUARE node 812 (M1025). Thus, the branch from decision block 710 to block 714 may be taken, and SQUARE node 812 is added to the same cluster as SQUARE node 812. Next, PRINT node 814 becomes the previous event node and SQUARE node 816 becomes the next event node. The new event node may be found to have a machine address (M1025) less than the previous event node machine address (M1045). Thus, the branch from decision block 710 to block 718 may be taken, and the cluster is ended to not include SQUARE node 816. SQUARE node 816 and PRINT node 818 may then be determined to be in the same cluster as each other.

In another example, when FUNC 1 node 820 is the previous node and FUNC1 node 822 is the next event node, at decision block 710 it may be found that both nodes have the same corresponding machine address (M1085). Therefore, process 700 may flow from decision block 710 to decision block 712. Both event nodes represent the same event, a function call. Therefore, the process may flow from decision block 712 to block 716, where the cluster is ended. Similarly, the cluster of FUNC1 node 822 is ended when FUNC1 node 824 is processed. Thus, the call to func1( ) in each iteration of loop 809 is in its own cluster.

As discussed herein, mechanisms described may be combined and performed in a variety of manners, including performing debugging actions on a portion of a debuggee program. FIG. 9 illustrates an example embodiment of a process 900 for debugging a debuggee program by iteratively executing one or more portions of the debuggee program and performing debugging actions.

The illustrated portions of process 900 may begin at loop 902, which iterates one or more times for portions of the debuggee program. Loop 902 includes blocks 904-12. The process may flow to block 904, where a portion of the debuggee program is executed. The process may flow to block 906, where the execution of the debuggee program may be paused at a break point. The break point may result from a user action, such as entering a command. It may result from a configured break point that instructs the debugger to conditionally or unconditionally break at a location in the debuggee program. The break point may result from a configured condition that is not associated with a specified location, such as the call stack reaching a specified level, an amount of execution time, an exception in the debuggee program, or another condition. At a break point, a user may inspect or modify program variable values, as discussed herein. Also, as discussed herein, inspection or modification of program variables may cause the debugger to insert associated data in an event in the event stream.

The process may flow to block 908, where a slice of the call graph may be built, based on events that have occurred. The process may flow to block 910, where one or more debug commands may be processed. These actions may be similar to those described in blocks 408-410 of FIG. 4.

The process may flow to block 912, which terminates loop 902. Loop 902 may iterate any number of times. It may exit in response to a user command, a condition, or in response to other actions. Upon exiting loop 902, the process may flow to done block 914 and exit or return to a calling program.

The example embodiment of process 900 illustrated in FIG. 9 includes actions that may be performed at various phases described in FIG. 1B. For example, the actions of blocks 904-906 may be in the execution and live debugging phase; the actions of block 908 may be in the call graph generation phase; the actions of block 910 may be in the call graph debugging phase. Thus, the illustrated process shows a way in which the various phases may be combined and interleaved in a debugging session.

Figure 10:
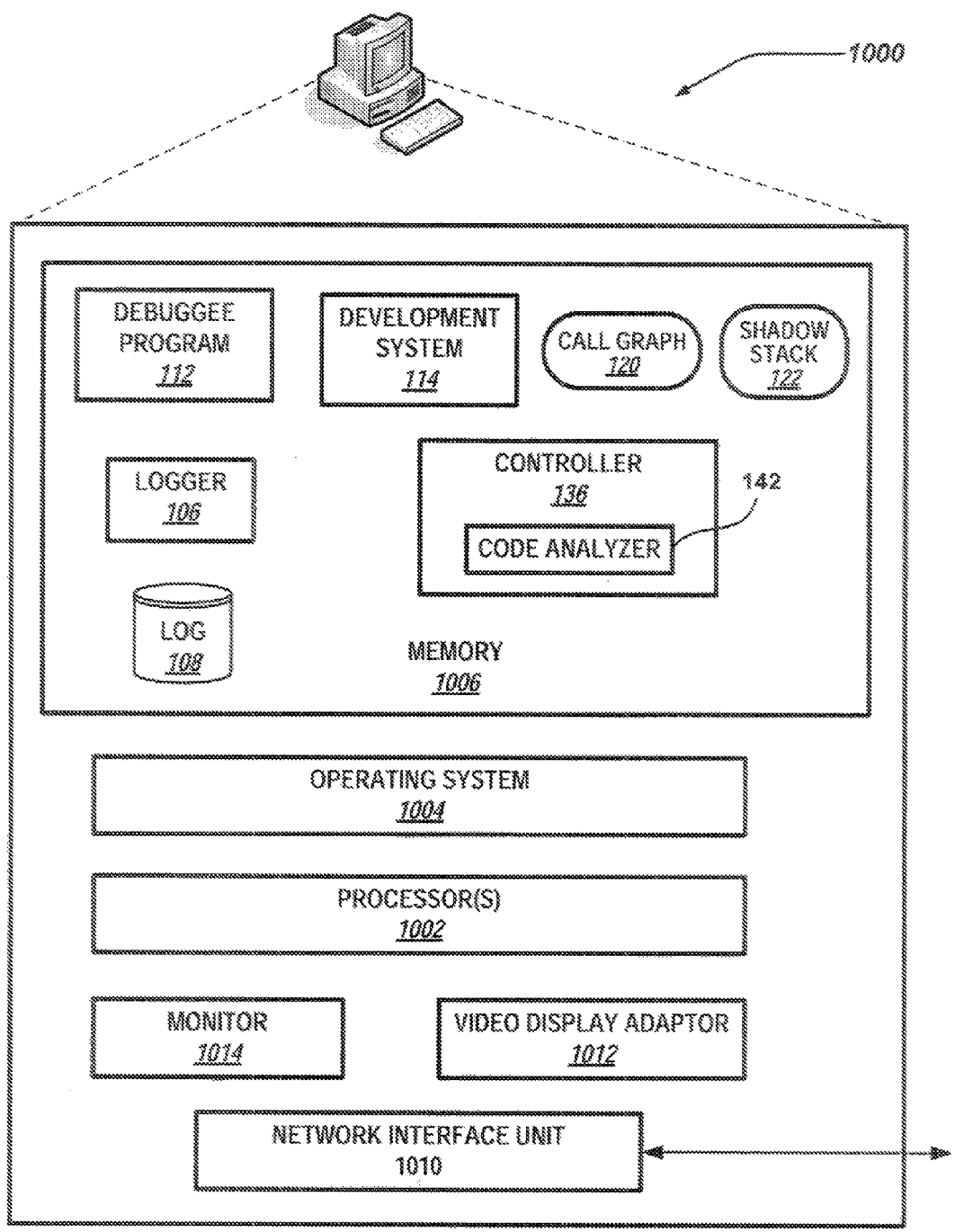
FIG. 10 is a block diagram of a computing device that may implement embodiments of the technologies described herein.

FIG. 10 shows one embodiment of a computing device 1000, illustrating selected components of a computing device that may be used to perform functions described herein and attributed to development system 104. Computing device 1000 may include many more components than those shown, or may include less than all of those illustrated.

As illustrated, computing device 1000 includes one or more processors 1002, which perform actions to execute instructions of various computer programs. In one configuration, each processor 1002 may include one or more central processing units, one or more processor cores, one or more ASICs, cache memory, or other hardware processing components and related program logic. As illustrated, computing device 1000 includes an operating system 1004. Operating system 1004 may be a general purpose or special purpose operating system. The Windows® family of operating systems, by Microsoft Corporation, of Redmond, Wash., are examples of operating systems that may execute on computing device 1000.

Memory 1006 may include one or more of a variety of types of computer storage media, including volatile or non-volatile memory, RAM, ROM, solid-state memory, disk drives, optical storage, or any other medium that can be used to store digital information. In one configuration, memory 1006 may store one or more of debuggee program 102, development system 104, logger 106, call graph debugger 136, and code analyzer 142. In some configurations, any one or more of these components, or a portion thereof, may be implemented in hardware, software, or a combination thereof. Memory 1006 may store log 108, call graph 120, or shadow stack 122. In some embodiments, the components illustrated as stored within memory 1006 may be distributed among multiple computing devices in any of a number of configurations.

Computing device 1000 may include a video display adapter 1012 that facilitates display of debug information, or a speech component (not shown) that converts text to audio speech and presents the information to a user. Though not illustrated in FIG. 10, computing device 1000 may include a basic input/output system (BIOS), and associated components. Computing device 1000 may also include a network interface unit 1010 for communicating with a network. Embodiments of computing device 1000 may include one or more of a display monitor 1014, keyboard, pointing device, audio component, microphone, voice recognition component, or other input/output mechanisms.

It is to be noted that the structures and processes described herein apply to a single thread of execution in a debuggee program. In an environment of a multi-threaded debuggee program, the mechanisms may be applied to each thread, such that each thread has a corresponding call graph and shadow stack. Logging and retrieval of events may be performed so that events of different threads may be distinguished and processed with respect to their corresponding structures.

It will be understood that each block of the flowchart illustration of FIGS. 4-7, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-based method of debugging a debuggee computer program after an execution of at least a portion of the debuggee program, comprising:
   a) receiving a call graph having a plurality of nodes, each node representing a corresponding event that occurred during the debuggee program execution, the nodes ordered based on the debuggee program execution, including a first node representing a first event corresponding to a first machine address and corresponding to a source language statement and a second node representing a second event corresponding to a second machine address and corresponding to the source language statement;
   b) selectively clustering together the first node and the second node based on a comparison of the first machine address and the second machine address; and
   c) in response to a command to perform a step operation, selectively performing the step operation to include the first node and the second node, based on whether the first node and the second node are clustered.

2. The computer-based method of claim 1, receiving the call graph comprises in response to receiving a command to perform a step operation, retrieving a portion of the call graph including nodes proximate to a current node.

3. The computer-based method of claim 1, selectively clustering comprises:
   a) if the second node is ordered after the first node and the second machine address is less than the first machine address, determining not to cluster; and
   b) if the second node is ordered after the first node and the second machine address is greater than the first machine address, determining to cluster.

4. The computer-based method of claim 1, the first node having a corresponding event of a first type, the second node having a corresponding event of a second type, selectively clustering comprises determining whether to cluster based on a comparison of the first machine address and the second machine address and whether the first event type is equivalent to the second event type.

5. The computer-based method of claim 1, further comprising retrieving, from the call graph, debuggee program variable values associated with at least one node of the plurality of nodes, and providing the debuggee program variable values in response to a request.

6. The computer-based method of claim 1, further comprising:
   a) retrieving a variable value stored at a location associated with the first node;
   b) performing a control flow analysis of at least a portion of the debuggee program;
   c) determining whether to propagate the variable value to a third node based on the analysis; and
   c) selectively providing the variable value based on the determination of whether to propagate the variable.

7. The computer-based method of claim 1, the debuggee program having an associated call stack during the execution of the debuggee program, the method further comprising:
   a) retrieving a snapshot of the call stack stored in association with the first node; and
   b) in response to a request for the snapshot, providing the snapshot.

8. The computer-based method of claim 1, the debuggee program having an associated call stack during the execution of the debuggee program, the method further comprising:

a) retrieving a snapshot of the call stack stored in association with a node representing an event;
b) selectively modifying the snapshot based on a segment of the call graph after the node representing the event; and
b) in response to a request for the snapshot, providing the selectively modified snapshot.

9. A computer-based development system executed by a processor for debugging a debuggee program based on a call graph representing events that occurred during an execution of at least a portion of the debuggee program, the events ordered based on the execution, comprising:
  a) a call graph debugger that receives commands and requests for information and performs actions, including:
    i) selectively clustering together a first event corresponding to a first machine address and a source language statement and a second event corresponding to a second machine address and the source language statement, the first event and second event represented by respective nodes of the call graph, selectively clustering comprising if the second node is ordered after the first node and the second machine address is greater than the first machine address, determining to cluster together the first and second events;
    ii) in response to receiving a step debug command, performing a step operation that includes the first event and selectively includes the second event based on the selective clustering;
    iii) providing data indicative of whether the step operation includes the second event; and
    iv) providing one or more variable values stored in association with an event represented by the call graph.

10. The computer-based system of claim 9, the actions further comprising:
  a) performing a static analysis of a segment of the debuggee program;
  b) determining whether to propagate a variable value from the first event to a subsequent event based on the static analysis;
  c) selectively providing the variable value based on the determination of whether to propagate the variable value.

11. The computer-based system of claim 9, the first node having a corresponding event of a first type, the second node having a corresponding event of a second type, selectively clustering further comprises if the first machine address is equivalent to the second machine address and the first event type is equivalent to the second event type, determining to cluster together the first and second events.

12. The computer-based system of claim 9, further comprising a program database that stores associations between each machine address corresponding to a respective call graph node and a corresponding source language statement, selectively clustering comprising retrieving an identification of the source language statement and determining whether the first machine address and the second machine address correspond to the source language statement.

13. The computer-based system of claim 9, the actions further comprising:
  a) retrieving a variable value associated with the first node;
  b) performing a control flow analysis of at least a portion of the debuggee program;
  c) determining whether to propagate the variable value to a third node based on the analysis and a set of nodes between the first node and the third node; and
  c) selectively providing the variable value based on the determination of whether to propagate the variable.

14. The computer-based system of claim 9, further comprising a live debugger that performs live debugging actions including, in response to inspection of data at a break point, inserting the inspected data into a debugging action event and logging the debugging action event, the call graph debugger actions further comprising retrieving the inspected data from a node corresponding to the debugging action event and presenting the inspected data.

15. A computer-readable storage memory comprising computer program instructions for debugging a debuggee computer program based on a plurality of logged call trace events that result from an execution of at least a portion of the debuggee program, the program instructions executable by a processor to perform actions including:
  a) receiving an ordered set of the logged call trace events;
  b) determining whether to cluster together a subset of the set of the logged call trace events based on a machine address and a corresponding source language statement of each call trace event, the subset including at least two call trace events; and
  c) performing a step operation that includes the subset of logged call trace events based on the determining whether to cluster together the subset.

16. The computer-readable storage memory of claim 15, determining whether to cluster comprises if each call trace event of the subset corresponds to a matching source language statement and the ordering of the subset of the logged call trace events matches an ordering of the respective machine address of each call trace event, determining to cluster together the subset of the logged call trace events.

17. The computer-readable storage memory of claim 15, determining whether to cluster comprises if the ordering of the subset of the logged call trace events is reversed to an ordering of the respective machine address of each call trace event, determining to not cluster together the subset of the logged call trace events.

18. The computer-readable storage memory of claim 15, determining whether to cluster is based on whether each logged call trace event corresponds to a same execution iteration of a loop in the debuggee computer program.

19. The computer-readable storage memory of claim 15, the actions further comprising:
  a) retrieving a variable value corresponding to a first call trace event;
  b) determining whether to propagate the variable value based on a control flow analysis of at least a portion of the debuggee program; and
  c) selectively providing the variable value based on the determining whether to propagate.

20. The computer-readable storage memory of claim 15, the actions further comprising:
  a) determining a variable value based on a call trace event and a static analysis of at least a portion of the debuggee program; and
  b) providing the determined variable value.

* * * * *